US007613719B2

(12) United States Patent
Chang et al.

(10) Patent No.: US 7,613,719 B2
(45) Date of Patent: Nov. 3, 2009

(54) RENDERING TABLES WITH NATURAL LANGUAGE COMMANDS

(75) Inventors: Su Chin Chang, Woodinville, WA (US); Ravi Shahani, Redmond, WA (US); Michael Calcagno, Kirkland, WA (US); Robert Stumberger, Seattle, WA (US); Nicholas Caldwell, Lake Forest Park, WA (US); Allan Folting, Redmond, WA (US); Charles David Ellis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 10/804,815

(22) Filed: Mar. 18, 2004

(65) Prior Publication Data

US 2005/0210061 A1 Sep. 22, 2005

(51) Int. Cl.
  *G06F 7/00* (2006.01)
  *G06F 17/30* (2006.01)
  *G06F 17/00* (2006.01)
  *G06F 17/27* (2006.01)

(52) U.S. Cl. ............... 707/102; 707/3; 707/100; 704/9

(58) Field of Classification Search ............ 707/1, 707/3, 100, 4, 104.1; 705/64; 704/9
See application file for complete search history.

(56) References Cited

U.S. PATENT DOCUMENTS

| 5,555,169 | A | * | 9/1996 | Namba et al. ............. 704/9 |
| 5,734,889 | A | * | 3/1998 | Yamaguchi ............... 707/4 |
| 5,960,384 | A | * | 9/1999 | Brash ...................... 704/9 |
| 6,581,068 | B1 | * | 6/2003 | Bensoussan et al. ...... 707/104.1 |
| 6,947,923 | B2 | * | 9/2005 | Cha et al. ................. 707/3 |
| 2002/0107844 | A1 | * | 8/2002 | Cha et al. ................. 707/3 |
| 2003/0074181 | A1 | * | 4/2003 | Gharavy ................... 704/1 |
| 2004/0221235 | A1 | * | 11/2004 | Marchisio et al. ......... 715/534 |

(Continued)

FOREIGN PATENT DOCUMENTS

EP        1120720 A      8/2001

(Continued)

OTHER PUBLICATIONS

Thompson et al., "Learning to Parse Natural Language Database Queries into Logical Form", Proceedings of the ICML-97 Workshop on Automata Induction, Grammatical Inference, and Language Aquicision, Nashville, TN, Jul. 1997.

(Continued)

*Primary Examiner*—Mohammad Ali
*Assistant Examiner*—Patrick A Darno
(74) *Attorney, Agent, or Firm*—Joseph R. Kelly; Westman, Champlin & Kelly, P.A.

(57) ABSTRACT

The present invention relates to a method of manipulating a software application and processing data stored in a data source. The method includes receiving a natural language input and analyze the natural language input to identify semantic information contained therein. Portions of the natural language input are associated with command objects and entity objects of a schema based on the semantic information and the natural language input. The method also includes rendering data from the data source in a table of columns and rows based on the schema and the associated portions of the natural language input.

33 Claims, 5 Drawing Sheets

U.S. PATENT DOCUMENTS

2005/0043940 A1* 2/2005 Elder .......................... 704/9
2005/0216421 A1* 9/2005 Barry et al. .................. 705/64

FOREIGN PATENT DOCUMENTS

WO     0195145     12/2001

OTHER PUBLICATIONS

Dale et al., "The Realities of Generating Natural Language from Databases", Proceedings of the 11th Australian Joint Conference on Artificial Intelligence, Jul. 13-17, 1998.
Natural-Language Database Interfaces from ELF Software Co., "Northwind Tutorial", http://www.elf-software.com/docs/Northwind.htm, last updated Dec. 1998.
Knowles, A Natural Language Database Interface for SQL-Tutor, pp. 1-35, Nov. 1999.
Filipe et al., "Databases and Natural Language Interfaces", pp. 1-11.
Daniels, "Integratng a Spoken Language System with Agents for Operational Information Access", Lockheed Martin Advance Technology Laboratories.
Massimi et al., "An Introduction to Natural Language Databases-Tutorial for Novices", Dec. 6, 2002.
Ogbuji, "Thinking XML: Learning Objects Metadata", Dec. 2, 2003, http://www-106.ibm.com/developworks.
Popescu et al., "Towards a Theory of Natural Language Interfaces to Databases", pp. 149-157, IUI'03 Jan. 12-15, 2003.
Chong et al., "A Framework for Creating Natural Language User Interfaces for Action-Based Applications", Cornell University, AMILP'-3, Aug. 25, 2003.
Katz et al., "Group 1-Natural English to SQL Translator-Design Document-Final Revision".
Mexican Patent Application No. PA/a/2005/002951 Office Action dated Mar. 4, 2008.
D. Esposito, "Talk to Your Data" Aug. 1999, pp. 1-12.
M. Elder, "Intelligent Metadata: A Key to 1-40 Information Integration and Business Intelligence (BI)" 2003.
M. Gatius et al., "A domain-restricted task-guided natural language interface generator", Datalogiske Skrifter Univ. Denmark, 1996.
European Search Report, 4 pages, Nov. 10, 2006.
Chinese Patent Application No. 200510059220.2 Office Action dated Mar. 21, 2008.
Russian Application No. 2005107522/09(009045) Official Action dated May 27, 2009.

* cited by examiner

FIG. 5

RENDERING TABLES WITH NATURAL LANGUAGE COMMANDS

BACKGROUND OF THE INVENTION

The present invention relates to a method of manipulating a software application by resolving user input into application commands. In particular, the present invention relates to resolving user input into a command to render information from a data source, such as a database.

In typical computer systems, user input has been limited to a rigid set of user responses having a fixed format. For example, with a command line interface, user input must be of a specific form which uniquely identifies a single command and selected arguments from a limited and specific domain of possible arguments. Similarly, with a graphical user interface, only a limited set of options are presented to the user and it is relatively straight forward for a developer to define a user input domain consisting of a limited set of commands or entities for each specific user input in the limited set of user inputs.

By limiting a user to a rigid set of allowed inputs or responses, computer systems have required a significant level of skill from the user or operator. It has traditionally been the responsibility of the user to mentally translate the desired task to be performed into the specific input recognized by the applications running on the computer system. In order to expand the usability of computer systems, there has been an ongoing effort to provide applications with a natural language (NL) interface. The natural language interface extends the functionality of applications beyond their limited input set and opens the computer system to inputs in a natural language format. The natural language interface is responsible for performing a translation from the relatively vague and highly context based realm of natural language into the precise and rigid set of inputs required by a computer application.

Resolving natural language input to render information from a data source, such as a database, can be difficult to perform due to the customized nature of data sources and the many ways for which to render information from a data source. In particular, rendering tables to analyze information that is stored in a data source is performed with specific instructions from a user defining what information should be rendered and how to render it. Due to this cumbersome interface, many users have difficulty rendering tables for useful data analysis. Providing a user-friendly interface to create and render tables from data source information would provide a more efficient tool for which information can be analyzed.

SUMMARY OF THE INVENTION

The present invention relates to a method of manipulating a software application, which includes processing data stored in a structured data source. The method includes receiving a natural language input and analyzing the natural language input to identify semantic information contained therein. Portions of the natural language input are associated with command objects and entity objects of a schema based on the semantic information and the natural language input. The method also includes rendering data from the data source in a table of columns and rows based on the schema and the associated portions of the natural language input.

Another aspect of the present invention relates to a computer readable medium having instructions for processing data in a structured data source including dimensions and values associated with the dimensions. The instructions include a user interface module adapted to receive natural language input and render a table. A table generation module is adapted to access the dimensions and values and define a schema for rendering the dimensions and values. Furthermore, an interpretation module is adapted to associate terms in the natural language input with an entity object of the schema corresponding to dimensions in the data source and generate candidate interpretations of how to render data in the data source based on the natural language input, the dimensions and the schema.

Another aspect of the present invention is a method of processing information to drive an application including receiving a natural language input. The natural language input is analyzed to identify semantic information contained therein. The method also includes accessing a schema to identify command objects and entity objects based on the semantic information and the natural language input and performing an action associated with the application based on the command object and the entity object.

DETAILED DESCRIPTION OF ILLUSTRATIVE EMBODIMENTS

Figure 1:
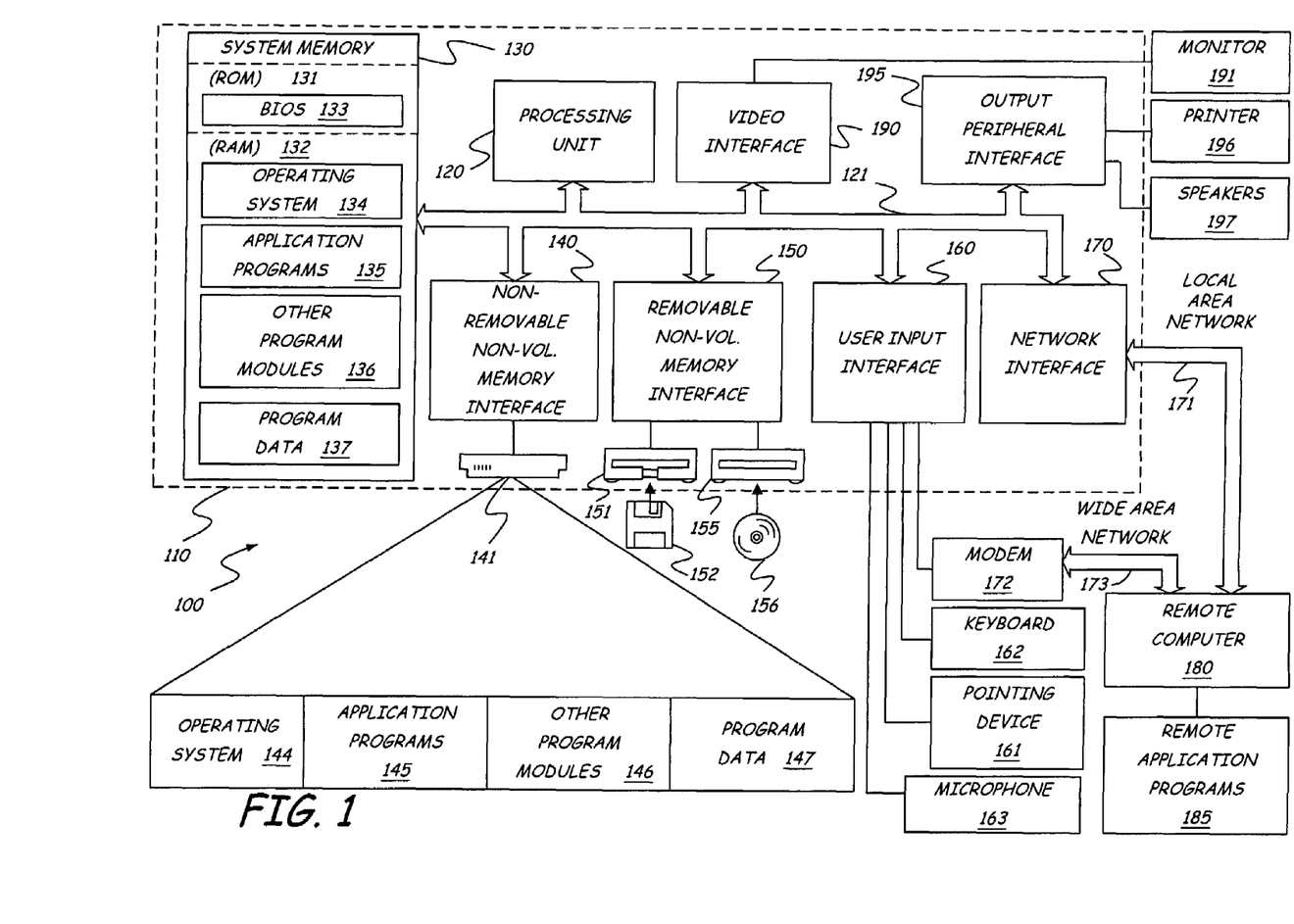
FIG. 1 is a block diagram of a computing system environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. For natural user interface applications, a user may further communicate with the computer using speech, handwriting, gaze (eye movement), and other gestures. To facilitate a natural user interface, a computer may include microphones, writing pads, cameras, motion sensors, and other devices for capturing user gestures. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Typically, application programs 135 have interacted with a user through a command line or a Graphical User Interface (GUI) through user input interface 160. However, in an effort to simplify and expand the use of computer systems, inputs have been developed which are capable of receiving natural language input from the user. In contrast to natural language or speech, a graphical user interface is precise. A well designed graphical user interface usually does not produce ambiguous references or require the underlying application to confirm a particular interpretation of the input received through the interface 160. For example, because the interface is precise, there is typically no requirement that the user be queried further regarding the input, i.e., "Did you click on the 'ok' button?" Typically, an object model designed for a graphical user interface is very mechanical and rigid in its implementation.

In contrast to an input from a graphical user interface, a natural language query or command will frequently translate into not just one, but a series of function calls to the input object model. In contrast to the rigid, mechanical limitations of a traditional line input or graphical user interface, natural language is a communication means in which human interlocutors rely on each other's intelligence, often unconsciously, to resolve ambiguities. In fact, natural language is regarded as "natural" exactly because it is not mechanical. Human interlocutors can resolve ambiguities based upon contextual information and cues regarding any number of domains surrounding the utterance. With human interlocutors, the sentence, "Forward the minutes to those in the review meeting on Friday" is a perfectly understandable sentence without any further explanations. However, from the mechanical point of view of a machine, specific details must be specified such as exactly what document and which meeting are being referred to, and exactly to whom the document should be sent.

The present invention relates to interpreting natural language input to drive an application and its associated actions. A schema can be defined to both drive interpretation of the natural language input as well as initiate actions associated with the application. As a result, the schema interacts both with the application itself and semantic interpretations of natural language input by a user. As appreciated by those skilled in the art, the schema can be separate code and/or included with application code. Aspects of the present invention can be utilized in a number of different environments to provide an improved natural language interface to a user. One particular environment that can utilize aspects of the present invention involves the rendering of information from a structured data source such as a database. The schema can be used to render a table of columns and rows or a single cell for example. In the case where a single cell of information is rendered, the information can be an answer to a question presented in natural language rather than providing the data in a table format. For example, a user may enter, "How many claims did California have paid in 1999?" The answer "3482" could then be presented so a user need not peruse through a large amount of data to find the answer.

Figure 2:
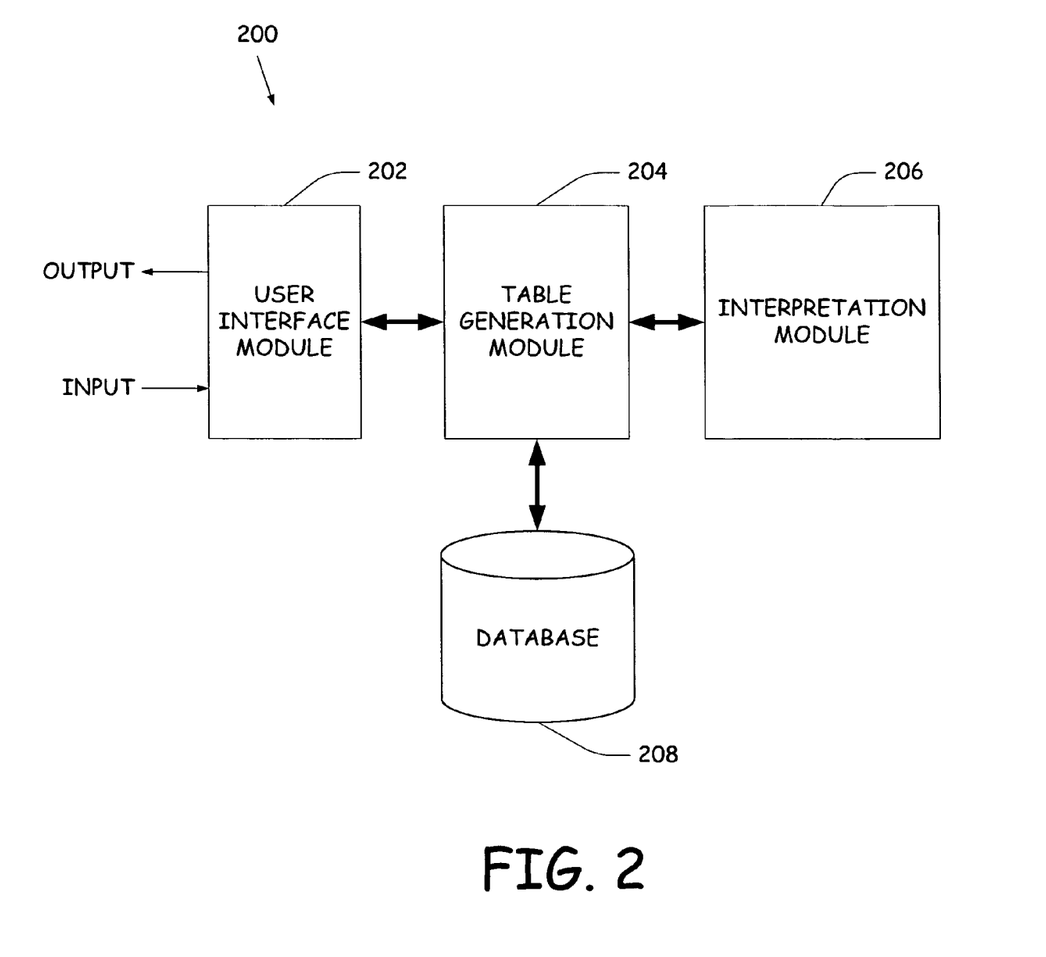
FIG. 2 is a block diagram of a system for rendering a table based on user input.

FIG. 2 illustrates a block diagram of a system for resolving natural language input from a user and rendering table information based on the natural language input. System 200 includes a user interface module 202, a table generation module 204, an interpretation module 206 and a database 208. It is worth noting that database 208 is an exemplary data source. The data source can take many forms such as a SQL database, OLAP cube or Microsoft Excel Worksheet. A user provides natural language input to user interface module 202 in a form of a command, question or other input related to generating a table. For example, the user may provide, "Show gross profit for aircraft and destination by year.", or, "What were the total revenues for 737 in 1999?", or simply "profit". The user interface module 202 receives the natural language input and provides it to table generation module 204.

Table generation module 204 defines a schema of commands and associated attributes for various commands that can be used when rendering a table. For example, the commands can include create, show, add, hide, highlight, filter, clear, etc. and include attributes further defining the commands. The commands can also include printing a table and creating a chart from data in database 208. The schema can be provided to interpretation module 206 to drive interpretations of the input. Alternatively, the schema can be used to render a single cell of information. Table generation module 204 utilizes interpretation module 206 to aid in determining what information should be rendered based on the natural language input received from interface module 202 and the defined schema that drives actions preformed to build and generate tables. Table generation module 204 accesses database 208 in order to identify words and/or phrases that correspond to items stored in database 208 and provides them to interpretation module 206.

The interpretation module 206 analyzes the user input, schema and database words and phrases to generate candidate semantic interpretations of what information to render to the user. A schematic analysis of the user input is first performed to provide semantic information for interpreting what the user would like rendered. For example, a named entity in the input can signal a term that the user wishes to be rendered as a page, row or column or within a data area of a table. Other semantic techniques can also be used such as identifying parts of speech, accepting partial matches of terms and/or relying on certain parts of speech for matches, identifying morphological alternatives (i.e. "region" and "regional"), resolving concatenation of names (i.e. "home owner" and "homeowner"), date normalization (i.e. "1/1/04" and "Jan. 1, 2004"), identifying synonyms via a word thesaurus, allow switched word orders (i.e. "total revenue" and "revenue total") and ranking methods. Other semantic information can be identified by interpretation module 206 such as negation of values (i.e. hide), comparatives (i.e. values above a threshold), etc.

Using the semantic information and schema, interpretation module 206 associates one or more tasks in the natural language input with a command object of the schema and associates other information in the natural language input with one or more frame objects and/or one or more entity objects of the schema. The schema can also include other objects such as denoter and restriction objects that can denote other entities and describe properties of objects. Once natural language input is associated with objects of the schema, candidate interpretations are resolved and sent to table generation module 204.

In one exemplary embodiment, user interface module 202 can be a spreadsheet application such as Microsoft Excel provided by Microsoft Corporation of Redmond, Wash. The spreadsheet application can be configured to process and render all types of database information. For example, the spreadsheet application can be an on-line analytical processing (OLAP) rendering tool. OLAP refers to a processing method that enables a user to easily and selectively extract and view data from a database in various ways. In an OLAP data model, information is viewed conceptually as cubes, which consist of descriptive categories (dimensions) and quantitative values (measures). The multidimensional data model makes it simple for users to formulate complex queries, arrange data on a report, switch from summary to detail data, and filter or slice data into meaningful subsets. For example, dimensions in a cube containing sales information can include time, geography, product, channel, organization, and scenario (budget or actual). Measures can include dollar sales, unit sales, inventory, headcount, income, and expense.

Within each dimension of an OLAP data model, data can be organized into a hierarchy that represents levels of detail on the data. For example, within the time dimension, there can be these levels: years, months, and days; similarly, within the geography dimension, there can be these levels: country, region, state/province, and city. A particular instance of the OLAP data model would have the specific values for each level in the hierarchy. A user viewing OLAP data will move up or down between levels to see more or less detailed information.

In one embodiment of the present invention, the natural language input provided by a user can be resolved to create a so-called PivotTable in a spreadsheet application such as Microsoft Excel based on OLAP cube dimensions. A PivotTable is an interactive table that can summarize large amounts of data. The interactive interface rendering the table enables a user to rotate rows and columns of information in order for the user to view different summaries of data in database 208, filter the data by displaying different pages and/or display details related to the database information. The PivotTable contains fields, each of which summarizes multiple rows of information from the source data. The PivotTable can also summarize data by using a summary function such as summing, counting and/or averaging specific cells in the table. In order to create a PivotTable, a user can invoke table generation module 204. In one embodiment, table generation module 204 is a wizard that guides the user to enter information pertaining to rendering table information.

In this embodiment, table generation module 204 can define a schema based on actions available for building and modifying a PivotTable. The schema can be represented as a hierarchy of command, frame and entity objects. Other objects can include denoter, named entity and restriction objects. The command object identifies tasks and actions, the frame object identifies the action relating to how data is to be displayed and the entity object identifies the data. Specific instances of these objects can be used to implement rendering of information. The instances can inherent properties from a base class, if desired. The schema is used by the table generation module 204 to perform the actions on the data to generate a table and by interpretation module 206 to drive interpretation of user input.

Figure 3:
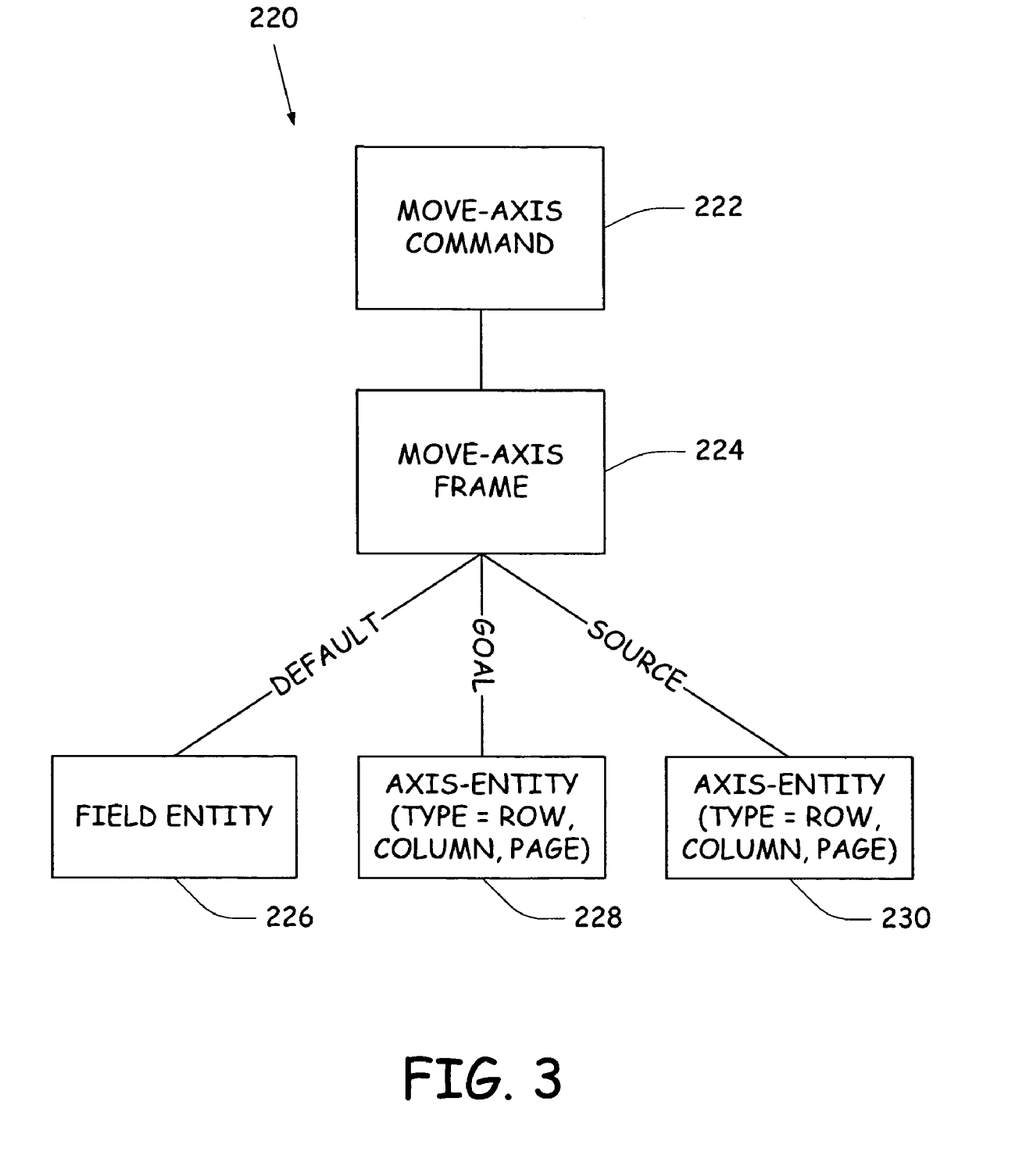
FIG. 3 is a block diagram of an exemplary schema.

FIG. 3 is a block diagram of an exemplary schema that is used to move a field of data between axes on a table. Schema 220 includes command object 222, which is illustratively a "move-axis" command. Command object 222 includes an associated frame object 224 that is a "move-axis" frame. Frame object 224 includes three associated entity objects 226, 228 and 230. The frame object 224 associates each of the entity objects 226, 228 and 230 with the command object 222. The entity objects are associated with data in database 208. In one embodiment, the entity objects can be associated with a column or row to be rendered. In the illustrated embodiment, entity object 226 is a default entity, which herein is a field entity and specifies the field of data that is to be moved. Thus, if an interpretation of the use input does not resolve a particular entity needed to perform the command in command object 222, field entity 226 will be resolved to a default value, which can be based on various rules. Entity object 228 is a goal entity, which defines the axis for which to render the data. Entity object 230 is a source entity, which defines the current field that is to be moved to a different axis.

Figure 4:
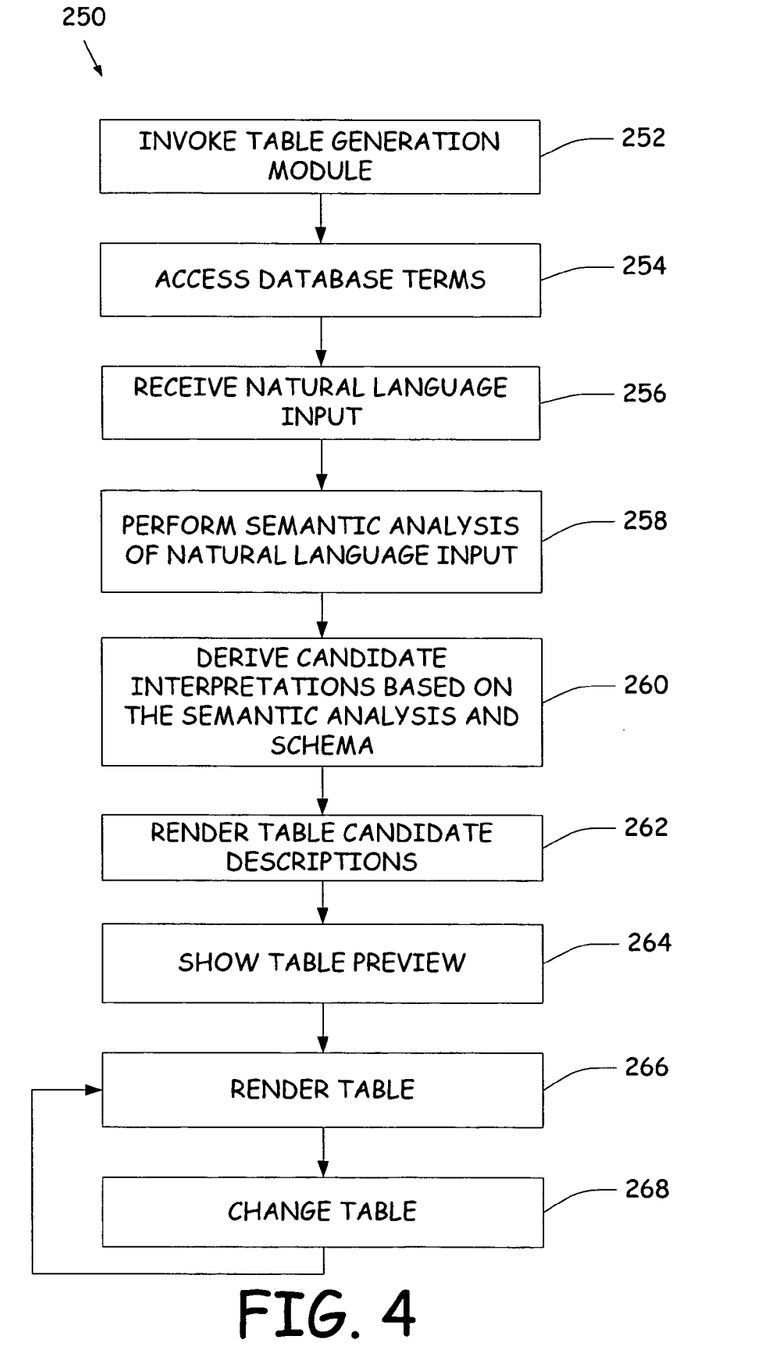
FIG. 4 is a flow chart of an exemplary method for rendering a table.

FIG. 4 is a flow chart of an exemplary method for rendering a table to a user. Method 250 begins at step 252 wherein the table generation module is invoked. The table generation module can also access database terms and/or phrases corresponding to dimensions, levels, measures and/or members of database 208 at step 254 that will be used to match terms from user input. The database terms identified can be maintained in a history for future use to improve performance of table generation module 204. At step 256, natural language input is received from a user. The natural language input can be of any form, including text from a keyboard input, speech data and/or handwriting data and be of any language including English, German, French, Spanish, Japanese, etc.

Given the natural language input, a semantic analysis of the input can be performed at step 258 to identify semantic information associated with the input. Candidate interpretations of the user input can then be derived based on the semantic information and associating portions of the user input with portions of the schema as described above. It is worth noting that the command need not be explicitly expressed in the natural language input, but can be implied from the input. For example, the input "apples and bananas" can be implied to be used with a "show" command. Using the candidate interpretations, table candidate descriptions can be rendered at step 262. The table candidate descriptions can take on many forms to create an interactive, user-friendly interface. For example, interpretations and/or table previews can be presented while a user is typing, recognized terms in the input can be highlighted, multiple table configurations (i.e. an entity as a row or a column) can be presented, a natural language description of table candidate descriptions can be presented in a list and ambiguous term alternatives can be presented in a pop-up menu.

Additionally, a user can select local ambiguities in the candidate descriptions. For example, if a user enters "sales" in the input, one of the candidate descriptions could include the term "number of sales", which is a part of the database 208 and could equate with the term "sales". By providing an interactive approach to resolving local ambiguities, a user could select "number of sales" as an equivalent to "sales". This information (i.e. equating "sales" and "number of sales") can be maintained and further be used to drive future interpretations.

If a user selects one of the table candidate descriptions, that particular table is then rendered at step 266. Alternatively, if desired, the table can be rendered "on-the-fly" when a term is recognized or changes occur in the user input. Also, a portion of the natural language input can be used to recognize and indicate visually terms as a user types. For example, a recognized term can be highlighted as a user types. Once the table has been rendered, a user may change the table by providing a further command or multiple commands to modify the table or render a new table. The further command can for example be used to highlight portions of the table, hide and/or add rows and columns, sort and filter information as well as other commands at step 268. The new table can then be rendered at step 266.

Figure 5:
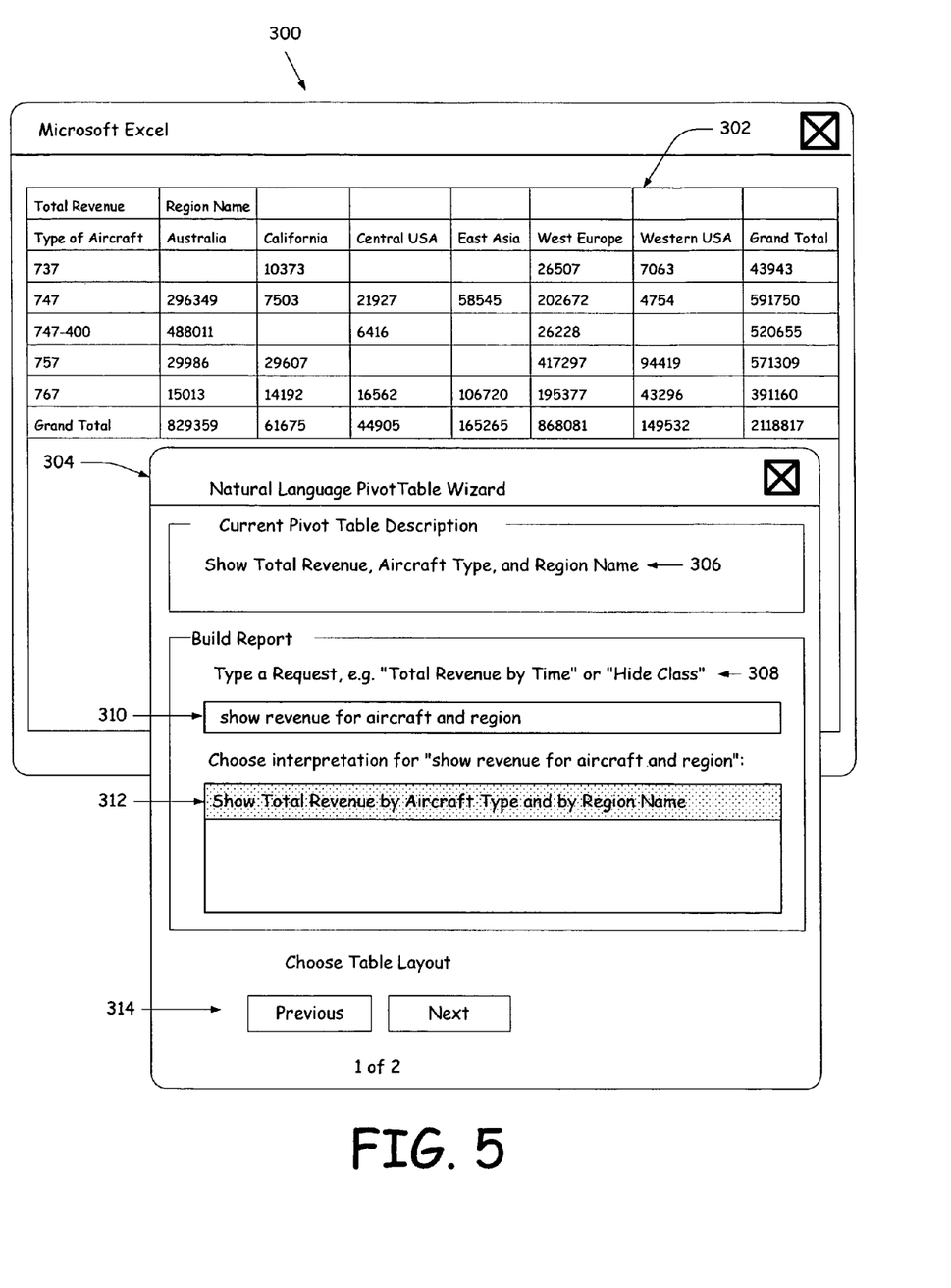
FIG. 5 is a screen shot of a user interface for receiving input from a user and rendering table information.

FIG. 5 illustrates an exemplary interface 300 used in accordance with an embodiment of the present invention. Interface 300 includes a table display 302 for displaying information from database 208 in a table of columns and rows. In the embodiment illustrated, total revenue for various types of aircraft is shown by region. A window 304 is provided for a user to view table descriptions and provide natural language input that is used by table generation module 204. Window 304 includes a table description 306 that describes the contents of the table currently displayed in display 302. Additionally, an example 308 of input for building a table is provided. The user may input text into field 310 in order to render a table. Candidate descriptions 312 can further be provided to the user as described above in a list for the user to easily select one of the candidates from the list. Additionally, buttons 314 can be provided for the user to select a particular table layout. For example, buttons 314 can switch a dimension from a column to a row. In one embodiment, the number of variable layouts (or configuration) can be restricted based on the order of terms in the natural language input.

In the example illustrated in FIG. 4, a user has provided the natural language input, "show revenue for aircraft and region" in input field 310. Table generation module 204, having accessed terms from data base 208, has identified the dimensions "Total Revenue", "Type of Aircraft" and "Region Name". Interpretation module 206, using the input in field 310 and the dimensions in database 208, resolves the input and provides the candidate description "Show Total Revenue by Aircraft Type and by Region Name" at 312.

Upon user selection of this interpretation, the current description 306 and table display 302 are updated to show the selected table and associated description. The user is then allowed to enter further natural language commands in field 310 pertaining to the table in display 302 or pertaining to a new table. For example, the user can provide "Hide Australia", "show only 747", "highlight revenues over $10,000", etc. In these examples, the application will hide the Australia column, render a table only with data associated with the 747 Type of Aircraft and highlight Total Revenue values greater than $10,000, respectively.

As a result of the embodiments described above, a natural language interface for rendering information from a data source, such as a database, in a table of columns and rows is provided. The interface makes it easier for users to generate and render tables used for data analysis. Thus, data analysis by rendering tables can be performed in a more time efficient and user-friendly manner.

Although the present invention has been described with reference to particular embodiments, workers skilled in the art will recognize that changes may be made in form and detail without departing from the spirit and scope of the invention.

What is claimed is:

1. A method of processing data retrieved from a structured data source that is stored on a computer storage medium, comprising:
   receiving natural language input;
   analyzing the natural language input to identify semantic information contained therein;
   associating portions of the natural language input with a command object identifying a command from a plurality of commands, wherein the plurality of commands are related to rendering data that has been retrieved from the structured data source and designated for rendering, a frame object identifying an arrangement for rendering data, and an entity object of a schema based on the semantic information and the natural language input, wherein the entity object relates to the designated data that is to be rendered based on the command object and the frame object;
   rendering the designated data in a plurality of candidate tables based on a plurality of candidate interpretations of semantic information provided in the natural language input, wherein each candidate table includes columns and rows based on the schema and the associated portions of the natural language input.

2. The method of claim 1 and further comprising accessing the data source to identify words and phrases associated with dimensions in the data source.

3. The method of claim 2 wherein accessing further comprises identifying words and phrases associated with levels and values in the data source.

4. The method of claim 1 wherein the command object relates to a task to be performed for rendering data.

5. The method of claim 1 and further comprising:
   changing the table based on a further command received.

6. The method of claim 5 wherein the further command is highlighting a portion of the table.

7. The method of claim 5 wherein the further command is sorting a portion of the table.

8. The method of claim 5 wherein the further command is filtering information in the table.

9. The method of claim 5 wherein the further command is adding information to the table.

10. The method of claim 5 wherein the further command is clearing information in the table.

11. The method of claim 5 wherein the further command includes switching the row and column information.

12. The method of claim 1 and further comprising:
   providing an interactive interface to a user for entering the natural language input.

13. The method of claim 12 and further comprising:
   performing at least one of indicating recognized terms in the natural language input and providing candidate interpretations of semantic information in the natural language input while a user enters the natural language input.

14. The method of claim 1 and further comprising:
   rendering a natural language description of information in the table.

15. The method of claim 1 and further comprising:
   maintaining a history of previous tables rendered for future use.

16. The method of claim 1 and further comprising associating portions of the natural language input with words and phrases associated with the data source.

17. The method of claim 1 wherein analyzing further comprises identifying ambiguous terms in the natural language input and presenting candidate alternatives for the ambiguous terms.

18. A method of processing information to drive an application, comprising:
   providing an interactive interface to a user for entering a natural language input;
   receiving the natural language input;
   analyzing the natural language input to identify semantic information contained therein;
   accessing a schema to identify a command object, a frame object and an entity object based on the semantic information and the natural language input, the command object identifying a command performed in the application, the frame object identifying how to render data retrieved from a data source stored in a computer storage medium and the entity object associated with a portion of the retrieved data that is designated for use by the application; and performing an action associated with the application based on the command object, the frame object and the entity object wherein the action includes rendering all of the designated data into each of a plurality of candidate tables based on a plurality of candidate interpretations of semantic information provided in the natural language input wherein rendering each of the candidate tables includes having the frame object associate the entity object with the command object such that the frame object defines what portion of the designated data identified by the entity object is displayed in the columns and what portion of the designated data identified by the entity object is displayed in the rows.

19. The method of claim 18 wherein the application is a spreadsheet application.

20. The method of claim 18 wherein accessing the schema includes identifying multiple entity objects.

21. The method of claim 18 wherein accessing the schema includes identifying multiple command objects.

22. A method of displaying information retrieved from a data source stored on a computer storage medium, comprising:

receiving a first natural language input from a user;

analyzing the first natural language input to identify semantic information contained therein;

associating portions of the first natural language input with a command object, a frame object and an entity object of a schema based on the semantic information and the first natural language input;

displaying a table of columns and rows to the user illustrating data retrieved from the data source as a function of the command object, the frame object and the entity object;

receiving a second natural language input from the user referring to the table of columns and rows;

altering the schema based on the second natural language input; and modifying the arrangement of the previously displayed data in the table as a function of the altered schema and displaying the newly arranged data in a modified table to the user.

23. The method of claim 22 wherein the frame object corresponds to how to render data.

24. The method of claim 22 wherein the command object relates to a task to be performed for rendering data.

25. The method of claim 22 wherein the entity object relates to data in the data source.

26. The method of claim 22 wherein the second natural language input relates to highlighting a portion of the table.

27. The method of claim 22 wherein the second natural language input relates to sorting at least a portion of the table.

28. The method of claim 22 wherein the second natural language input relates to filtering information in the table.

29. The method of claim 22 wherein the second natural language input relates to adding information to the table.

30. The method of claim 22 wherein the second natural language input relates to clearing information in the table.

31. The method of claim 22 wherein the second natural language input relates to switching the row and column information.

32. The method of claim 22 and further comprising associating portions of the natural language input with words and phrases associated with the data source.

33. The method of claim 22 wherein the second natural language input includes a command that is different from the command object in the schema.

* * * * *